June 9, 1931.  S. F. DAVENPORT  1,809,776
HOOK MOUNTING FOR LURES
Filed March 12, 1930
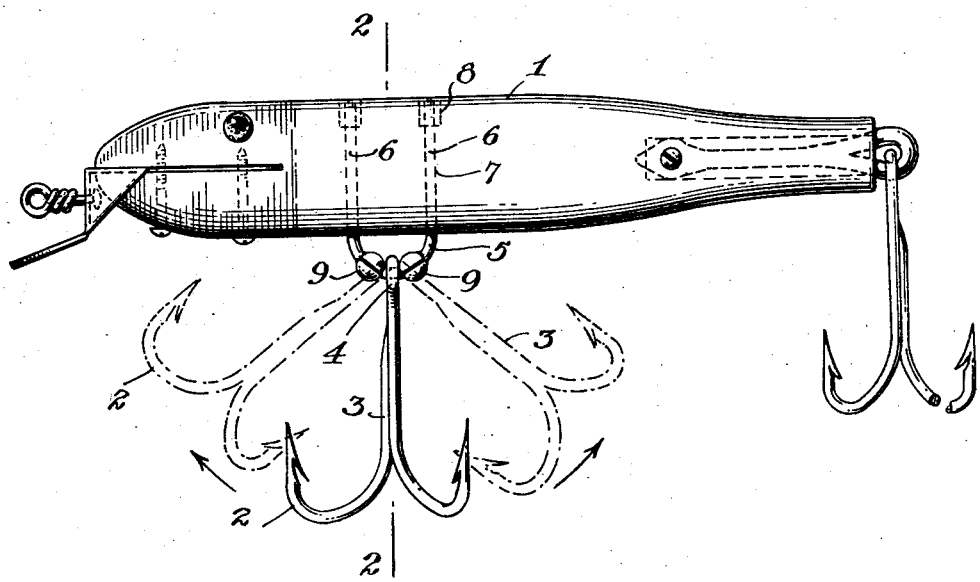
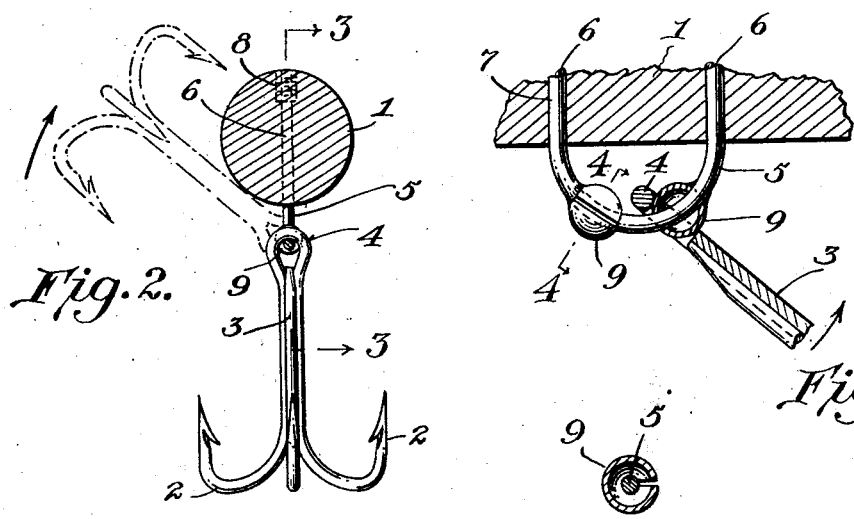
Inventor
S. F. Davenport
By Eccleston & Eccleston
Attorneys Patented June 9, 1931

1,809,776

UNITED STATES PATENT OFFICE

SAM F. DAVENPORT, OF AUBURN, INDIANA, ASSIGNOR TO THE CREEK CHUB BAIT CO., OF GARRETT, INDIANA

HOOK MOUNTING FOR LURES

Application filed March 12, 1930. Serial No. 435,293.

This invention relates to fishing lures of the type in which the lure body consists of a representation of a minnow or the like, and which is provided with a highly finished surface of ornamental appearance. In such lures the attractive appearance of the lure bodies is often mutilated and rendered unsightly by reason of scratching and gouging out of portions thereof by contact with the points of the fish hooks.

An object of the present invention resides in the provision of a mounting for fish hooks on lure bodies such that the freedom of movement necessary to fishing operations is maintained but in which the hooks are limited in their movements sufficiently to prevent any possibility of the barbs of the hooks coming into contact with the surface of the lure body.

A further object of the invention consists in the provision of such a limiting means for the hooks which will also serve to prevent any possibility of the hooks becoming lodged or cocked out of normal suspended position as by frictional or wedging action between the hooks and their suspending means.

In the accompanying drawings

Figure 1 is a side elevational view of a lure embodying the present invention and showing in dotted lines the limits of movement of the hooks.

Figure 2 is a transverse sectional view taken on line 2—2 of Figure 1 and also showing in dotted lines one of the extreme positions of the fish hooks.

Figure 3 is a detail sectional view through a portion of the mounting for the hooks; and Figure 4 is a transverse sectional view taken on line 4—4 of Figure 3.

Referring to the drawings in greater detail the numeral 1 indicates the lure body which may be of wood or any other buoyant material. The body is indicated as having the general form of a small fish and is as usual in such devices the surface is highly finished and decorated in simulation of fish scales and the like.

The fish hook in the embodiment of the invention illustrated is of the gang hook type comprising a plurality of hook portions 2 and a shank portion 3. The shank is provided with an eye 4 which is threaded onto the hook-supporting means 5, here shown as a wire rod or the like bent into substantially U-shaped form to provide attaching legs 6. After the hook is threaded on the member 5 and certain stops are secured thereto as will be described, the legs 6 are passed through parallel openings 7 formed in the body and are secured against withdrawal by any suitable anchoring means 8. The legs 6, it will be understood, are preferably of sufficient length to extend entirely through the body 1 and allow the curved or base portion of the member to protrude beyond the body of the lure as shown in Figures 1 and 3. By this means a strong and rigid pivotal mounting is provided for the fish hook as well as one which is pleasing to the eye.

As already mentioned, the attractive appearance of many lures is greatly marred by the continued scratching or gouging of the ornamental surfaces thereof by the points or barbs of the hooks. Efforts have been made to remedy this defect by limiting the pivotal movements of the hooks by various arrangements of stops and the like, but such efforts have not been altogether satisfactory, partly because of the unsightly appearance of the structure employed and partly because of the expense involved. According to the present invention the U-shaped mounting 5 for the hooks provides an excellent means on which to place stops for the hooks so as to permit the necessary freedom of action of the hooks and yet prevent the engagement of the points thereof with the lure body. Such stops are indicated by the numeral 9 and are spaced apart a sufficient distance to afford adequate movement for the hook in a direction longitudinally of the lure body but prevent contact therewith, and, of course, the contact of the hook shanks (Fig. 2) with the lure body prevents engagement of the points with the body in a transverse direction.

The stops 9 may take a variety of forms but in the present instance are shown as bent up into substantially spherical form about the base portion of the member 5 and secured thereto as by soldering or the like. These stops, of course, are secured to the member 5 after the eye 4 of the hook is threaded thereon but before the legs 6 of the member are inserted in the openings 7 of the lure body.

The pivotal mounting as above described is simply and cheaply constructed, is strong and durable in operation, is effective in affording protection to the lure body, is of a neat and pleasing appearance, and prevents any possibility of the hooks cocking or lodging at abnormal angles with respect to the body of the lure.

In accordance with the patent statutes I have described what I now believe to be the preferred form of the invention, but obviously various minor changes may be made in the details of construction without departing from the spirit of the invention, and all such alterations are intended to be included within the scope of the appended claims.

What I claim as new and desire to secure by Letters Patent is:

1. In a fish lure, a body portion, an integral substantially U-shaped member having its ends extending through the body portion and secured thereto with the base of the U-shaped portion extending beyond the lure body, and stops on said base for limiting the pivotal movements of a hook mounted thereon.

2. In a fish lure, a body portion, means secured to said body for pivotally suspending a hook therefrom, and beads fixedly secured to said supporting means for limiting the pivotal movements of the hook.

3. In a fish lure, a body portion, means secured to said body for pivotally suspending a hook therefrom, and hollow beads formed from sheet metal fixedly secured to said supporting means for limiting the pivotal movements of the hook.

4. In a fish lure, a body portion, a substantially U-shaped member having its ends secured to the body portion and providing a pivotal mounting for a hook, and hollow beads formed from sheet metal fixedly secured to the base of said U-shaped portion for limiting the pivotal movements of the hook.

SAM F. DAVENPORT.